Figures 1, 2:
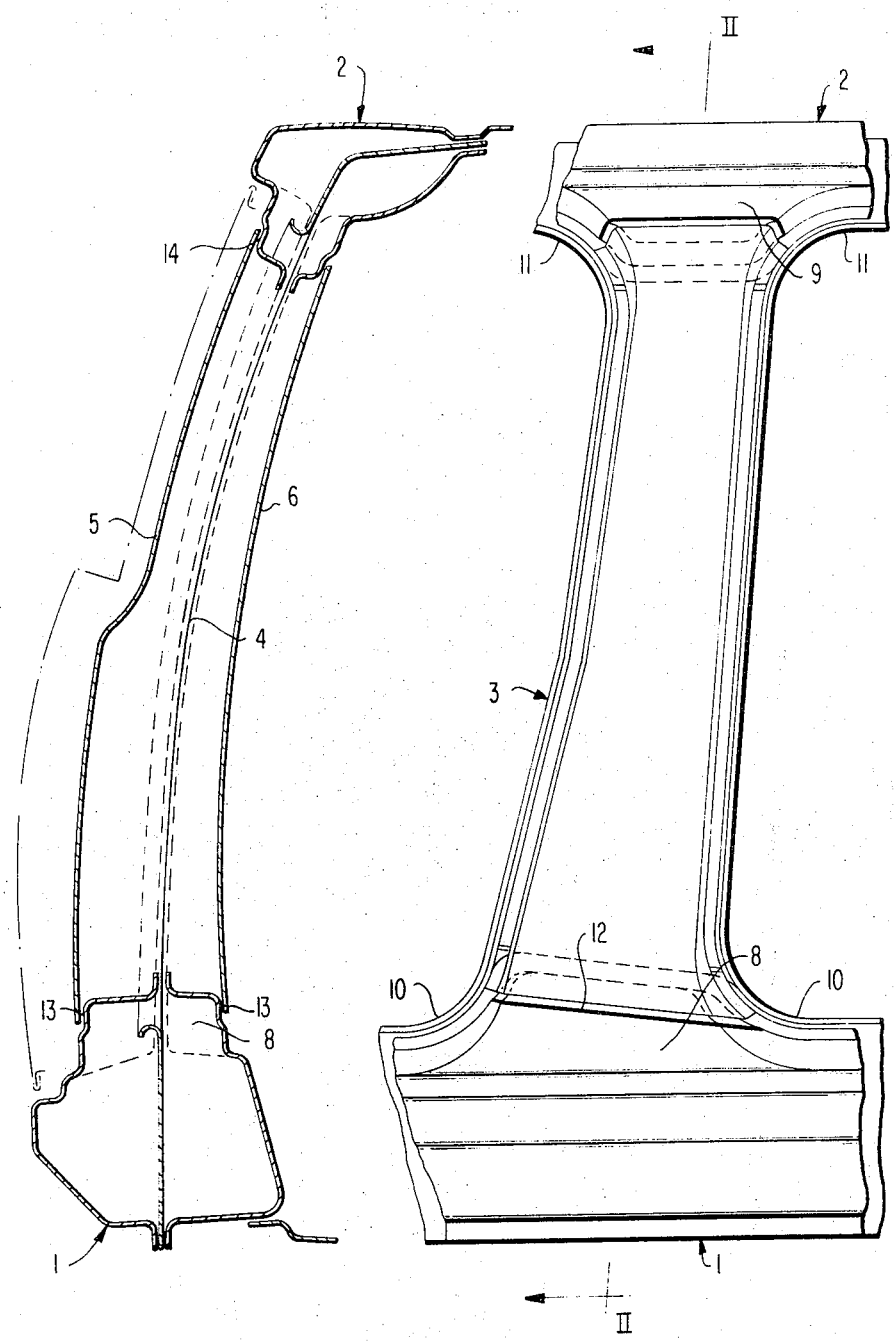

United States Patent [19]

Barenyi et al.

[11] 3,776,589
[45] Dec. 4, 1973

[54] VEHICLE BODY

[75] Inventors: Bela Barenyi, Maichingen; Heinrich Haselmann, Sindelfingen, both of Germany

[73] Assignee: Daimler-Benz Aktiengesellschaft, Stuttgart-Unterturkheim, Germany

[22] Filed: Jan. 27, 1972

[21] Appl. No.: 221,173

[30] Foreign Application Priority Data
Jan. 30, 1971  Germany................... P 21 04 454.2

[52] U.S. Cl............................................ 296/28 R
[51] Int. Cl............................................ B62d 27/00
[58] Field of Search............. 296/28 R, 28 F, 137 R

[56] References Cited
UNITED STATES PATENTS
2,164,098   6/1939   Tjaarda............................ 296/28 R
2,864,647   12/1958  Chesna............................. 296/28 F FOREIGN PATENTS OR APPLICATIONS
620,526   3/1949   Great Britain.................... 296/28 R
36,030    1/1958   Poland............................. 296/28 R Primary Examiner—Leo Friaglia
Assistant Examiner—John A. Pekar
Attorney—Paul M. Craig, Jr. et al.

[57] ABSTRACT

A support structure for motor vehicles, especially for passenger motor vehicles, which includes on each side of the vehicle one floor bearer and one roof bearer that are connected within the central area thereof by a door column; the connecting places for the door columns at the floor bearers and at the roof bearers are constructed as stamped-out parts extending in the direction of the door columns.

8 Claims, 5 Drawing Figures

VEHICLE BODY

The present invention relates to a body support structure for motor vehicles, especially for passenger motor vehicles, which includes on both sides one floor bearer and one roof bearer each, which are connected with each other within the central area by a door column.

It is known in the prior art to construct the door columns in one piece with the floor bearers and the roof bearers. This type of construction, however, is very costly without being able to attain any special advantages as regards rigidity.

It is additionally known to connect the door columns with the longitudinal bearers by way of further sheet metal parts, so-called shoes. This type of construction entails difficulties during the fastening which is realized generally by spot welding.

The present invention is concerned with the task to provide a support structure of the aforementioned type which permits a connection between the door columns and the longitudinal bearers without additional material expenditures and at least with the preservation or also with an increase of the rigidity of the flange connection. The present invention essentially consists in that the connecting places at the floor bearers and at the roof bearers are constructed as stamped-out portions extending in the direction of the door columns. Additionally, the advantage is attained thereby that the connecting places, along which the welded connections are undertaken, are disposed above the floor bearers so that, on the one hand, they are readily accessible whereas, on the other, the corrosion danger is considerably reduced which exists in particular within this area with the known types of construction. In one embodiment of the present invention which is particularly advantageous as regards rigidity, provision is made that the walls of the pressed-out or stamped-out portions begin with rounded-off portions in the associated floor bearers and roof bearers. It is thereby particularly advantageous if the door columns are widened within the area of the connecting places and terminate in rounded-off portions which pass over into the rounded-off portions of the stamped-out or pressed-out portions. A particularly favorable rigidity in the corner areas of the door opening is achieved thereby.

It is advantageous with respect to the corrosion danger if the pressed-out or stamped-out portions of the floor bearers are inclined with respect to the horizontal preferably downwardly toward the rear.

In order to enable a stepless transition between the longitudinal bearers and the door columns, it is advantageous if the upper edge of the stamped-out or pressed-out portions are offset inwardly by about the wall thickness of the door column. It is additionally advantageous from a structural point of view if the door columns consist of two sheet metal parts having mutually facing flanges.

Accordingly, it is an object of the present invention to provide a support structure for motor vehicles, especially passenger motor vehicles which avoids by simple means the aforementioned shortcomings and drawbacks encountered in the prior art.

Another object of the present invention resides in a self-supporting body structure for motor vehicles which is relatively simple and inexpensive in manufacture as well as assembly.

A further object of the present invention resides in a body support structure for motor vehicles, especially passenger motor vehicles, which permits the attainment of good rigidity of the vehicle, yet assures ready access to the connecting places.

Still another object of the present invention resides in a support structure for passenger motor vehicles which provides ready access to all the connecting places where spot-welding is to be undertaken.

A further object of the present invention resides in a body structure of the type described above which also minimizes the danger of corrosion within the area of the connection between the door column and longitudinal floor bearers.

Figure 3:
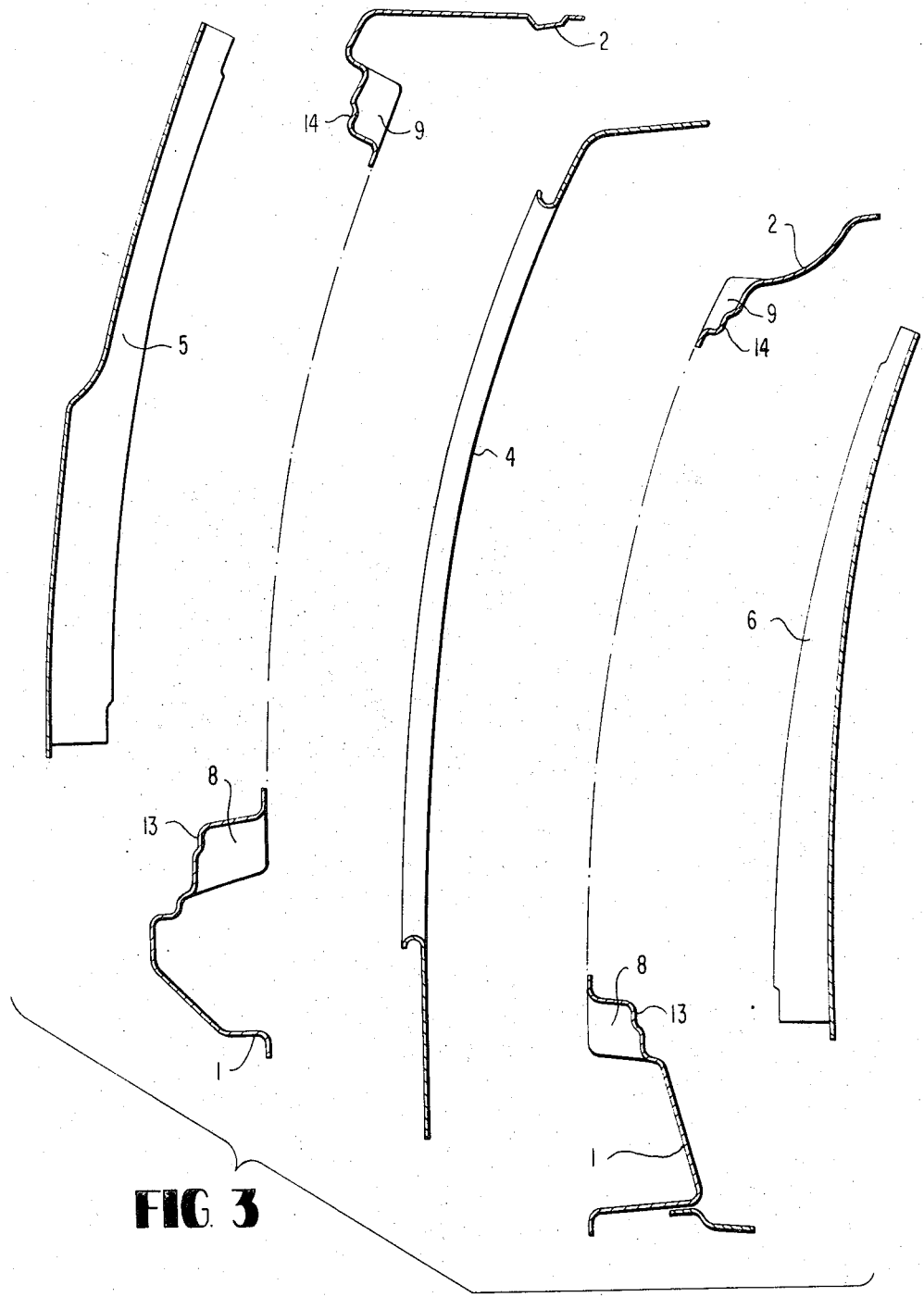
Figure 4:
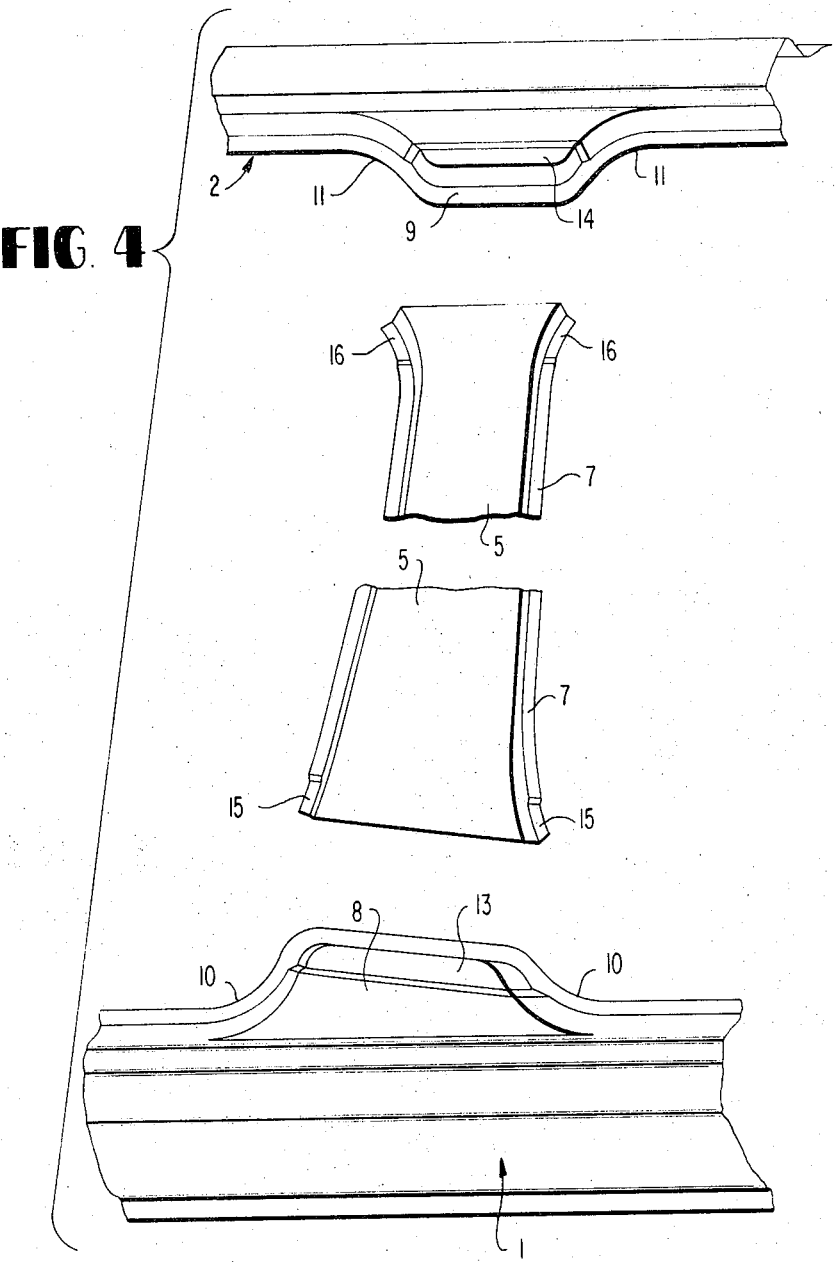
Figure 5:
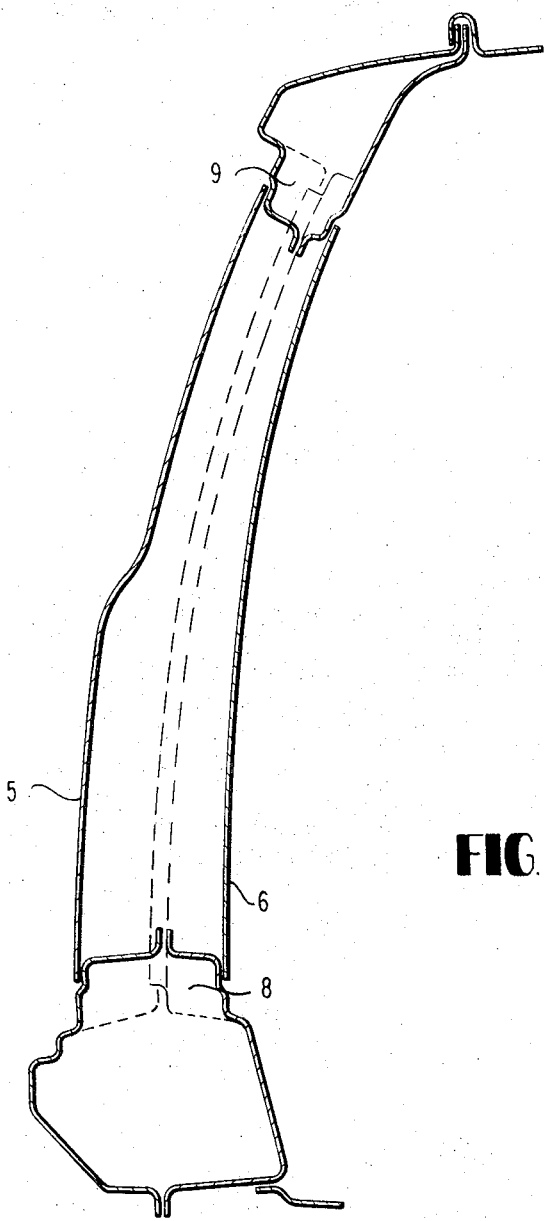

These and other objects, features and advantages of the present invention will become more apparent from the following description when taken in connection with the accompanying drawing which shows, for purposes of illustration only, two embodiments in accordance with the present invention and wherein:

FIG. 1 is a side view of a portion of a support structure in accordance with the present invention, FIG. 2 is a cross-sectional view taken along line II—II of FIG. 1, FIG. 3 is an exploded cross-sectional view, similar to FIG. 2, showing the various individual parts prior to their connection, FIG. 4 is an exploded partial side view, similar to FIG. 1, illustrating the individual parts prior to their connection, and FIG. 5 is a cross-sectional view, similar to FIG. 2, of a modified embodiment in accordance with the present invention. 1 and the roof bearer 2

Referring now to the drawing wherein like reference numerals are used throughout the various views to designate like parts, the frame-like support structure illustrated in the drawing includes on both sides a floor bearer generally designated by reference numeral 1 and extending in the longitudinal direction of the vehicle and a roof bearer generally designated by reference numeral 2 and also extending in the longitudinal direction of the vehicle. The floor bearer 2 are connected with each other in a conventional manner (not shown) within the forward and rearward end area of the passenger cell by vertical bearers. Additionally, conventional cross-bearers (not shown) are provided which connect with each other the two sides of the support structure. A further connection between the floor bearer 1 and the roof bearer 2 is provided by an approximately vertically extending door column generally designated by reference numeral 3 within the central area of the vehicle or of the passenger cell; the door column 3 delimits the forward and rearward door aperture.

The floor bearer 1 and the roof bearer 2 are constructed as hollow bearers by means of two half-shells which simultaneously form also the forward and rearward vertical bearers (not shown). The two half-shells are provided with mutually facing flanges, by means of which they are secured at a support member 4, for example, a sheet metal plate or sheet metal member 4, from the inside and/or outside by spot welding. Two pressed-out sheet metal parts 5 and 6 serve as door column 3 which are provided with mutually facing flanges 7 (FIG. 4) which are also secured by spot welding at the support sheet metal member 4.

In order to install and mount the door columns 3 on both sides of the support structure, both the floor bearer 1 as also the roof bearer 2 are provided with connecting places which are constructed as pressed-out or stamped-out portions 8 and 9 extending in the direction of the door column 3. These pressed-out or stamped-out portions 8 and 9 which constitute embossments, commence on the upper side of the floor bearer 1 and the bottom side of the roof bearer 2 by means of rounded portions 10 and 11 (FIGS. 1 and 4) so that the corners of the door apertures, visible only in part, are rounded off. The door column 3 is widened at its ends and terminates in rounded portions corresponding to the rounded portions 10 and 11. The partition or separating plane between the floor bearer 1 and the roof bearer 2 and the door column 3 extends approximately at half the height of the rounded portions 10 and 11. The separating plane 12 (FIG. 1) between the floor bearer 1 and the door column 3 thereby possesses an inclination directed downwardly toward the rear of the vehicle end.

As can be seen in particular from FIGS. 2 and 4, the upper edge 13 of the pressed-out or stamped-out portion 8 of the floor bearer 1 and the lower edge 14 of the pressed-out or stamped-out portion 9 of the roof bearer are offset inwardly by the wall thickness of the sheet metal elements 5 and 6 so that a flush transition is created thereby. Additionally, the flanges 7 of the sheet metal parts 5 and 6 are provided with corresponding offsets 15 and 16 (FIG. 4).

It is also possible, as shown in FIG. 5, to dispense with the arrangement of the support plate or sheet metal member 4. The sheet metal parts 5 and 6 can be constructed as shell-halves and can be directly welded to one another. The angularly bent rim edges delimiting the door apertures inwardly are then formed preferably by the inwardly disposed shell parts.

While we have shown and described only two embodiments in accordance with the present invention, it is understood that the same is not limited thereto but is susceptible of numerous changes and modifications as known to those skilled in the art and we, therefore, do not wish to be limited to the details shown and described herein but intend to cover all such changes and modifications as are encompassed by the scope of the appended claims.

What we claim is:

1. A support structure for motor vehicles comprising longitudinally extending hollow floor bearer means and roof bearer means at respective sides of a motor vehicle, each floor bearer means and roof bearer means including two facing half-shell portions connected together at mutually facing flanges and having at a central portion an integral stamped-out portion projecting transversely of the floor bearer means and the roof bearer means, said integral stamped-out portions of the floor and roof bearer means being in facing relationship on respective sides of the motor vehicle and a pair of hollow door column means connected one each to the floor bearer means and the roof bearer means at respective sides of the motor vehicle by fitting over the projecting stamped-out portions of the floor bearer means and the roof bearer means, each said door column means being formed of two facing half-shell portions connected together at mutually facing flanges, wherein the hollow door column means surrounds the projecting stamped-out portions of the floor bearer means and the roof bearer means such that a tight seal is effected between the door column means and the respective integral stamped-out portions of the floor bearer means and the roof bearer means.

2. A support structure according to claim 1, wherein the integral projecting stamped-out portions are formed with rounded walls commencing at the corresponding floor bearing means and roof bearing means.

3. A support structure according to claim 2, wherein the door column means are widened within the area of the connections with the floor bearer means and the roof bearer means and include rounded end portions surrounding the rounded walls of the stamped-out portions, thereby effecting a smooth rounded surface between the door column means and the floor bearer and roof bearer means.

4. A support structure according to claim 1, wherein the stamped-out portions of the floor bearer means are inclined with respect to the horizontal downwardly in the rearward direction.

5. A support structure according to claim 1, wherein the half-shell portions of the door column means are welded together at the mutually facing flanges and wherein the welded together sides of the door column means delimits a door aperture.

6. A support structure according to claim 1, wherein the half-shell portions of the door column means are welded together at the mutually facing flanges of the door column means by the interposition of a sheet metal support member.

7. A support structure according to claim 6, wherein the support member extends parallel to the entire length of the door column means with ends of the support member interposed between the mutually facing flanges of both the floor bearer means and the roof bearer means.

8. A support structure according to claim 1, wherein the hollow door column means completely circumferentially surrounds the projecting stamped-out portions of the floor and roof bearer means.

* * * * *